(12) United States Patent
Wilson et al.

(10) Patent No.: US 7,458,883 B2
(45) Date of Patent: Dec. 2, 2008

(54) APPARATUS FOR ABRADING A SURFACE

(75) Inventors: Brian Alexander Wilson, North Vancouver (CA); Ronald Eric Kliewer, Coquitlam (CA); Charles Donald Beadle, New Westminster (CA)

(73) Assignee: B A Werk Industries Ltd., North Vancouver (CA)

( * ) Notice: Subject to any disclaimer, the term of this patent is extended or adjusted under 35 U.S.C. 154(b) by 0 days.

(21) Appl. No.: 11/345,060

(22) Filed: Jan. 31, 2006

(65) Prior Publication Data

US 2007/0178999 A1 Aug. 2, 2007

(51) Int. Cl.
*B24B 7/18* (2006.01)

(52) U.S. Cl. ........................................ 451/353; 474/139

(58) Field of Classification Search ............... 474/87, 474/86, 85, 70, 137, 251, 111, 117, 134; 15/49.1, 50.1, 99; 451/353
See application file for complete search history.

(56) References Cited

U.S. PATENT DOCUMENTS

| | | | | |
|---|---|---|---|---|
| 2,565,658 | A | * | 8/1951 | Hilger ........................ 451/353 |
| 2,941,222 | A | * | 6/1960 | Allen et al. ................... 15/49.1 |
| 3,169,262 | A | * | 2/1965 | Allen et al. ................... 15/49.1 |
| 4,097,950 | A | * | 7/1978 | Satterfield ................... 15/49.1 |
| 4,328,645 | A | * | 5/1982 | Sauer .......................... 451/359 |
| 4,435,870 | A | * | 3/1984 | Tucker et al. ................... 15/98 |
| 4,616,449 | A | * | 10/1986 | Marton ........................ 451/456 |
| 5,027,470 | A | * | 7/1991 | Takashima .................... 15/385 |
| 5,253,384 | A | | 10/1993 | Joines et al. |
| 6,238,277 | B1 | | 5/2001 | Duncan et al. |
| 6,425,813 | B1 | | 7/2002 | Ernst |
| 6,494,772 | B1 | * | 12/2002 | Barnes et al. ............... 451/353 |
| 6,494,773 | B1 | * | 12/2002 | Marchini et al. ............ 451/353 |
| 6,540,596 | B1 | | 4/2003 | Van Der Veen |
| 6,595,838 | B1 | | 7/2003 | Palushi et al. |
| 6,616,517 | B2 | | 9/2003 | Palushi |
| 6,752,707 | B1 | | 6/2004 | Palushi |
| 6,783,447 | B2 | | 8/2004 | Van Vliet et al. |

(Continued)

FOREIGN PATENT DOCUMENTS

EP   1 607 181 A1   12/2005

(Continued)

OTHER PUBLICATIONS

Merriam Webster OnLine Dictionary, www.m-w.com, "eccentric", Apr. 13, 2006.*

(Continued)

*Primary Examiner*—Marcus Charles
*Assistant Examiner*—Terence Boes
(74) *Attorney, Agent, or Firm*—Laurence C. Bonar

(57) ABSTRACT

An apparatus for abrading a surface is provided. The apparatus has a compact profile and includes a drive mechanism disposed in a housing. The drive mechanism includes a substantially vertical drive shaft rotatably mounted on a first plate and including a drive pulley mounted on the shaft. The drive pulley is rotatably connected to at least one coplanar pulley mounted on a substantially vertical shaft and disposed between the first plate and a second plate attached substantially parallel to the first plate. Thus, use of the apparatus in height-restricted spaces is facilitated.

8 Claims, 6 Drawing Sheets

U.S. PATENT DOCUMENTS 6,786,556 B2 9/2004 Due
2005/0227600 A1* 10/2005 Fisher .................. 451/538

FOREIGN PATENT DOCUMENTS

WO     WO 95/30515     11/1995

OTHER PUBLICATIONS

Floor grinding and restoration of hardwood concrete, online: archived on Sep. 24, 2004 <<http:llweb.archive.orglweb12004092400534­51htlp:llwww.issintJ-inc.coml>>, pp. 1-2.*

Floor grinding and restoration of hardwood concrete, online: archived on Sep. 24, 2004 <<http://web.archive.org/web/20040924005345/http://www.issintl-inc.com/>>, pp. 1-2.

* cited by examiner

APPARATUS FOR ABRADING A SURFACE

BACKGROUND OF THE INVENTION

1. Field of Invention

This invention relates to surface conditioning and, in particular, to an apparatus for abrading a surface.

2. Description of Related Art

Indoor surfaces, such as floors inside a building, including wood, concrete or granite floors, and outdoor surfaces, such as decks and walkways, including wood, concrete or granite outdoor surfaces, often require renovation.

Renovating a wooden floor often involves sanding the wooden floor, and renovating a concrete or granite surface often involves grinding the surface.

Conventional schemes for sanding and grinding surfaces often require the use of multiple machines due to the limitations of each conventional machine.

U.S. Pat. No. 6,494,772 issued to Barnes et al. discloses a machine that is useable to sand hardwood floors and includes two covers mounted above a main housing. The added height of the two covers impedes the ability of the machine of Barnes et al. to sand a hardwood floor in height-restricted spaces, including beneath an overhanging fixture such as a cabinet or heating unit. Overhanging fixtures in buildings typically overhang between four and six inches above the floor surface. Such overhanging fixtures are often already in place when sanding or grinding is required, such as in the case of a renovation. If the sanding or grinding machine cannot fit under an overhanging fixture, an additional machine such as an edge sander must be used to complete the sanding or grinding task. Thus, there is an unaddressed need in the art for a single machine that can sand and grind an entire surface, including in height restricted spaces.

SUMMARY

The above shortcomings may be addressed by providing, in accordance with one aspect of the invention, an apparatus for abrading a surface. The apparatus includes a plurality of disks, each disk being adapted to receive an abrasive pad; a plurality of pulleys, each pulley being adapted to rotate a corresponding disk; and a single drive component in continuous contact with the pulleys such that the disks rotate when a primary pulley is driven.

The single drive component may include a belt. The belt may include a plurality of cogs on opposing sides of the belt for serpentine engagement with the plurality of pulleys. Each pulley and corresponding disk may be mounted on a corresponding substantially vertical shaft rotatably mounted at opposing ends thereof on a first plate and a second plate attached substantially parallel to the first plate, respectively, such that each pulley is disposed between the first and second plates. One primary shaft of a plurality of the shafts may extend above the second plate to an extended end, the primary pulley being mounted on the primary shaft such that the primary pulley is rotatably driven when the extended end of the shaft is driven. The apparatus may also include a vacuum manifold adapted to direct air flow from a plurality of manifold input ports to a single manifold output port. The manifold input ports may include a pair of spaced apart apertures extending through a rear section of the first plate.

In accordance with another aspect of the invention, the apparatus has a compact or low profile and includes a drive mechanism disposed in a housing. The drive mechanism includes a substantially vertical drive shaft rotatably mounted on a first plate and includes a drive pulley mounted on the shaft. The drive pulley is rotatably connected to at least one coplanar pulley mounted on a substantially vertical shaft and disposed between the first plate and a second plate attached substantially parallel to the first plate, thereby facilitating use of the apparatus in height-restricted spaces.

The apparatus may include a single drive component in continuous contact with the drive pulley and the at least one coplanar pulley. The single drive component may include a belt. The belt may include a plurality of cogs on opposing sides of the belt for serpentine engagement with the drive pulley and the at least one coplanar pulley. The drive pulley may be eccentrically mounted on the first plate. The apparatus may include a vacuum manifold adapted to direct air flow from a plurality of manifold input ports to a single manifold output port. The manifold input ports may include a pair of spaced apart apertures extending through a rear section of the first plate.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In drawings which illustrate by way of example only specific embodiments of the invention.

DETAILED DESCRIPTION

Figure 1:
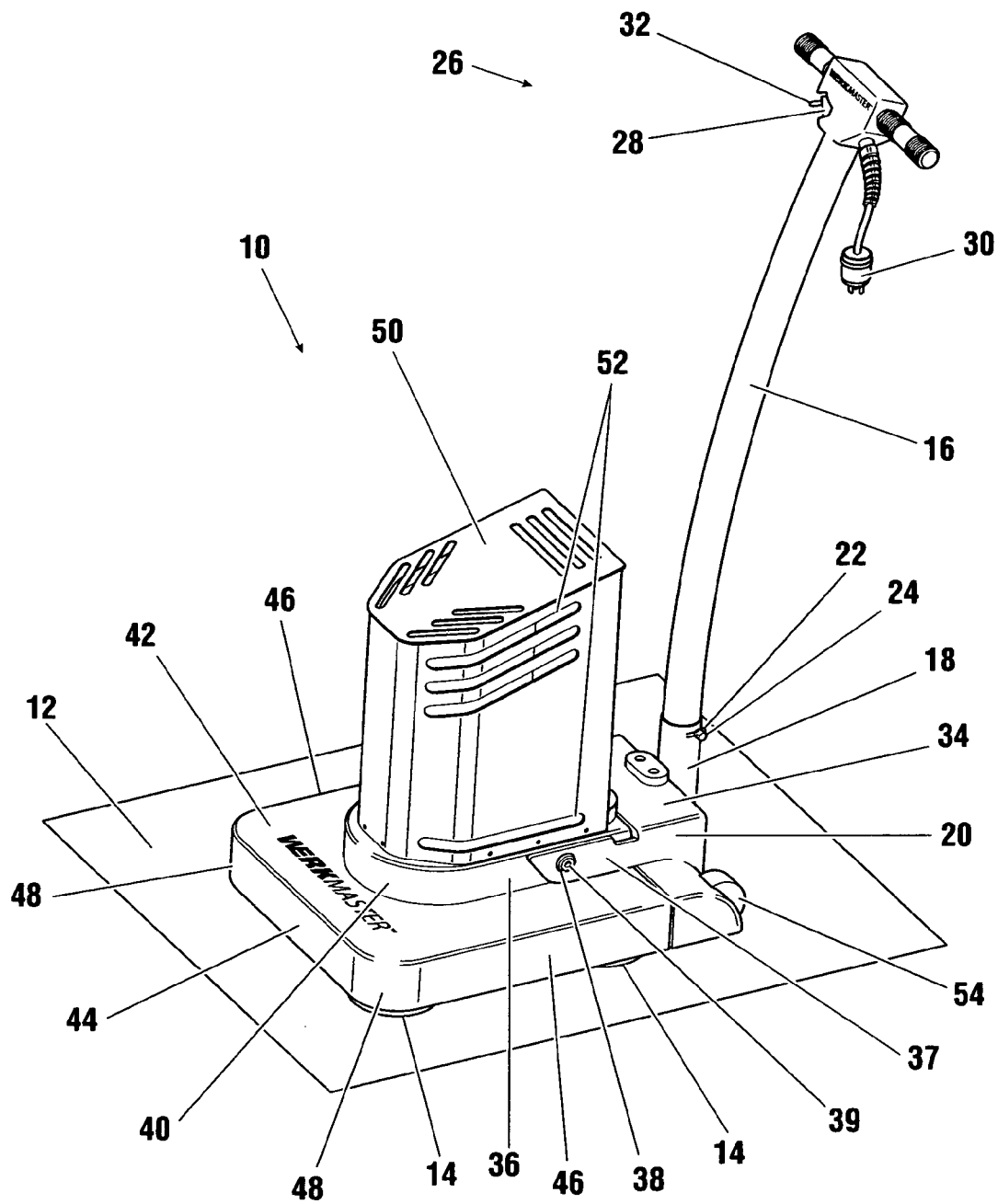
FIG. 1 is a perspective view of an apparatus in accordance with the preferred embodiment of the invention.

Referring to FIG. 1, an apparatus according to a first and preferred embodiment of the invention is shown generally upright at 10. The apparatus 10 is operable to sand, grind, polish, scuff, finish, clean, or otherwise abrade a surface 12. The surface 12 may be an indoor surface, such as a floor inside a building or an outdoor surface, such as an outdoor deck or walkway. The surface 12 may be made of any material suitable for walking thereon, including wood, concrete, asphalt, stone or granite. The apparatus 10 includes one or more disks 14 to which an operator may removably attach abrasive pads.

The apparatus 10 includes at its rear a handle 16 secured to a handle support 18 which is attached to a chassis 20 of the apparatus 10. The handle 16 may be secured to the handle support 18 by inserting the lower end of the handle 16 into the handle support 18 through an upper open end of the handle support 18, inserting a pin 22 through an aperture in the handle support 18 and through a correspondingly mating aperture in the handle 16, and securing the pin 22 in place. The pin 22 may be secured by the pin clip 24 shown in FIG. 1. Alternatively or additionally, the handle 16 may be secured to the apparatus 10 by threaded insertion, bolt and screw, clamp, or other suitable fastening measures. The handle 16 may have any suitable shape that permits an upright user to operate the apparatus 10, and is preferably elongated and arcuate as shown in FIG. 1. The arcuate shape of the handle 16 facilitates tilting of the apparatus 10 and improves maneuverability of the apparatus 10. The handle 16 includes at its upper end 26 a pair of handle bars to facilitate operation and control of the apparatus 10. A power switch 28 for connecting and disconnecting electrical power supplied to the apparatus by the power cord 30 is conveniently attached inside and contained within the handle 16. The power switch 28 is made visible in FIG. 1 by the cut-out appearance of the handle 16. An actuator 32 for operating the power switch 28 projects from the exterior of the handle 16.

The chassis 20 shown in FIG. 1 is preferably an articulated chassis and includes a rear chassis section 34, a front chassis section 36, and an articulation arm 37. The articulation arm 37 is attached to the rear chassis section 34 and has a slot 38 through which an articulation pin 39 may be received. The articulation pin 39 may be removably attachable to the front chassis section 36 or may be permanently affixed during manufacturing of the apparatus 10. As the upper end 26 of the handle 16 is directed by an operator in a downward direction, the articulation arm 37 tilts with the rear chassis section 34, thereby causing the slot 38 to move relative to the articulation pin 39. When the articulation pin 39 contacts the lower extremity of the slot 38, the entire articulated chassis 20 tilts with the handle 16, thereby lifting the front end of the apparatus 10. Articulation of the chassis 20 avoids contact between edges of the disks 14 and the surface 12. In this manner, gouges, scrapes, marks and other undesirable abrasions of the surface 12 are avoided when the apparatus 10 is tilted.

A housing 40 is mounted to the chassis 20 and includes a generally planar perimeter section 42 having a front perimeter wall 44, left and right side perimeter walls 46 and rounded front right and front left corners 48. The rounded front corners 48 advantageously facilitate use of the apparatus 10 near or along an edge of the surface 12 where an operator may need to turn the apparatus 10 while abutting one corner 48 against a wall or other obstruction (not shown). Thus, the rounded corners 48 facilitate abrasion of the entire surface 12, including portions thereof in the vicinity of an obstruction. The front perimeter wall 44 is preferably flat, thereby permitting the apparatus 10 to abut the wall or other obstruction along a wide portion of the surface 12. The minimal height of the front and side perimeter walls 44 and 46 permit the apparatus 10 to exhibit a compact, low profile, thereby facilitating use of the apparatus 10 in height-restricted spaces, such as beneath an overhanging fixture or other projection (not shown) that creates a height-restricted space above the surface 12.

A motor cover 50 secured to the apparatus 10 atop the housing 40 surrounds a motor (not shown) of the apparatus 10. The motor cover 50 includes air holes, such as the louvers 52 near the top and bottom of the motor cover 50, which permit air circulation around the motor and provide a pleasing aesthetic appearance to the apparatus 10.

Wheels 54 are affixed to the chassis 20 near opposing left and right sides of the apparatus 10 at its rear. The wheels 54 facilitate transporting or otherwise maneuvering the apparatus 10 when tilted.

Figure 2:
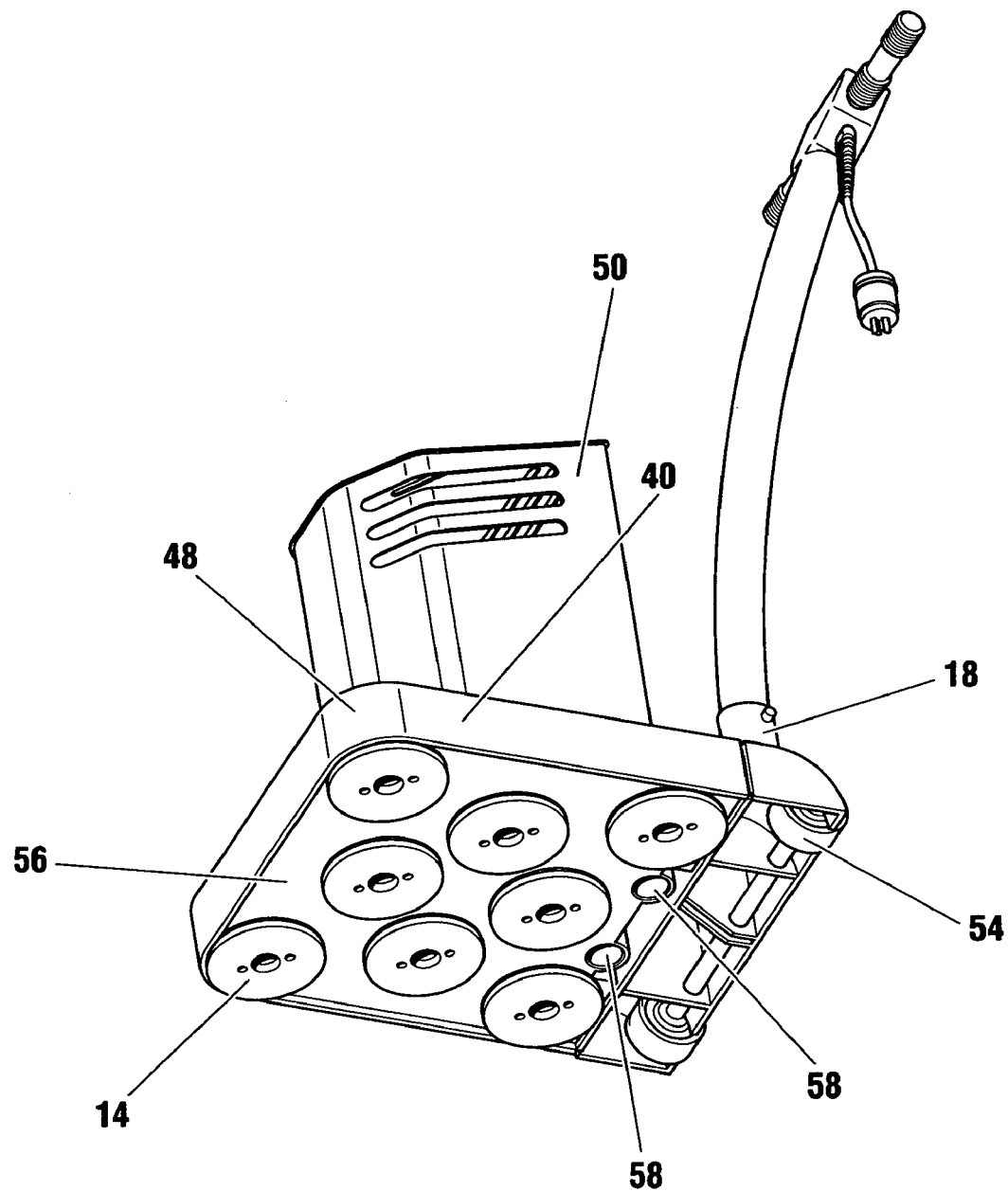
FIG. 2 is a perspective view of a portion of the apparatus shown in FIG. 1, showing coplanar disks parallel to a lower plate.

FIG. 2 shows eight coplanar disks 14 arranged in accordance with the preferred embodiment of the invention. Seen from the bottom of the apparatus 10, the disks 14 form a first set of four disks 14 arranged on an imaginary rectangle generally inward of and rotated by substantially forty five degrees from a second set of four disks 14 arranged near the corners of the housing 40. The disks 14 are generally parallel to a lower plate 56, which may be any rigid component of the chassis 20 capable of supporting the disks 14, as described further below. The lower plate 56 also advantageously hinders dust and other particulates produced by the abrading action of the apparatus 10 from entering into the interior of the housing 40.

Vacuum input ports, such as the two spaced apart apertures 58 in the lower plate 56 shown in FIG. 2, permit air flow and dust or other particulates to be drawn up from the surface 12 to a vacuum system (not shown here) which may be incorporated into, removably attachable or otherwise connectable to the apparatus 10. Preferably, the two apertures 58 are located in a rear section of the lower plate 56 generally near the two rearmost disks 14, and may be located generally rearward and inward of the two rearmost disks 14. While the apertures 58 shown in FIG. 2 are substantially circular in shape, the apertures 58 may have any shape and may be of any dimensions suitable for drawing air flow and dust particles therethrough.

Figure 3:
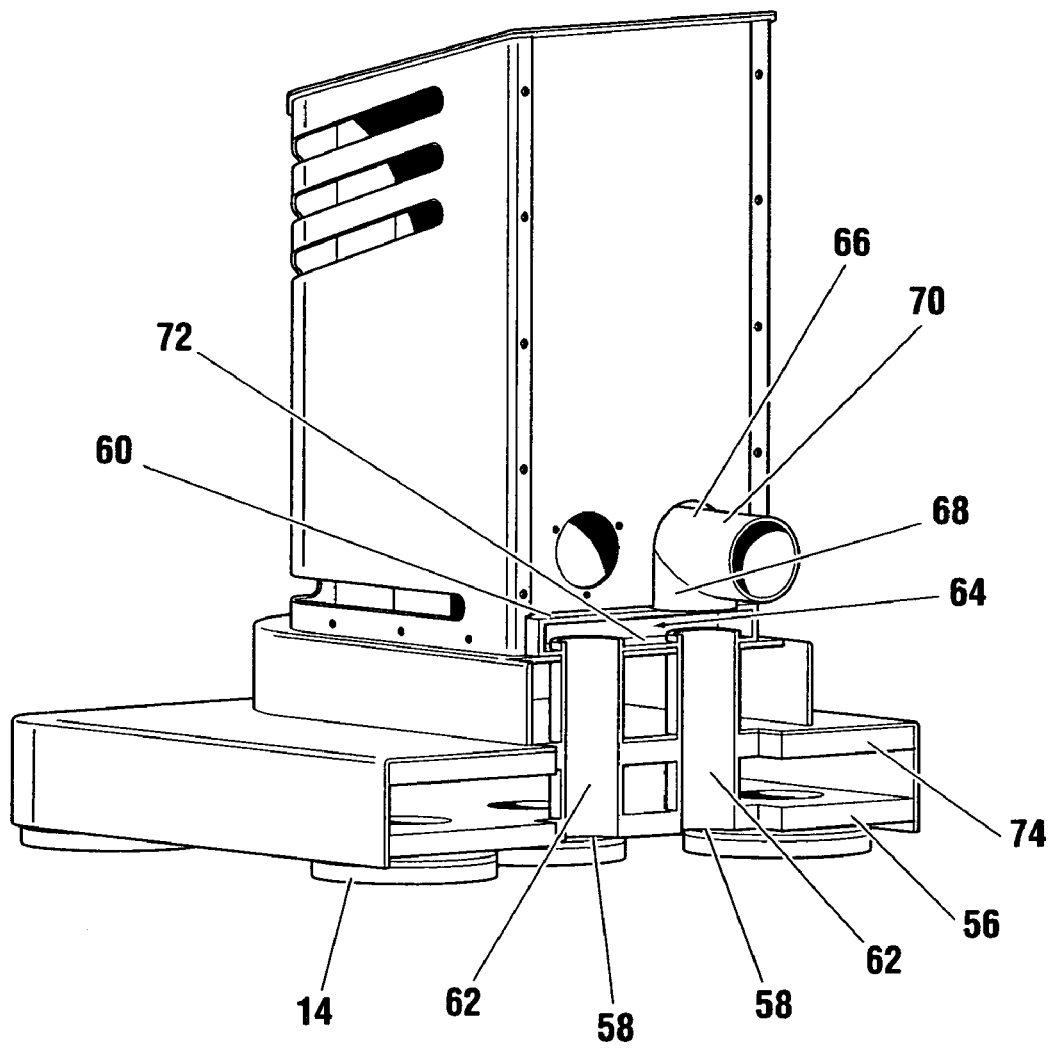
FIG. 3 is a perspective rear sectional view of a portion of the apparatus shown in FIG. 1, showing the vacuum system manifold.

FIG. 3 provides a perspective sectional view of a manifold 60 in accordance with an embodiment of the invention. The manifold 60 is preferably dimensioned to direct the dust and other particulates entering the apertures 58 to a single output vacuum port dimensioned for attachment to the vacuum system (not shown). In the embodiment illustrated by FIG. 3, the manifold 60 includes passageways 62 in fluid communication at their lower extremities with the apertures 58, respectively, and in fluid communication at their upper extremities with a chamber 64. The chamber 64 has connected thereto an outlet passageway 66 having a chamber connection portion 68, and an attachment portion 70 dimensioned to permit attachment to the vacuum system (not shown here). The chamber connection portion 68 and the attachment portion 70 are connected by a substantially right-angled bend therebetween. While the passageways 62 and the outlet passageway 66 are illustrated in FIG. 3 as generally circular tubes or pipes, other implementations are possible. For example, the passageways 62 are preferably formed by a plurality of spacing plates (not shown) stacked one upon each other between the lower plate 56 and the chamber 64 in which vertically aligned apertures of the spacing plates are in alignment with the apertures 58. In this manner, the chamber 64 need not include the base 72 shown in FIG. 2 to ensure the manifold 60 is fully enclosed apart from the vacuum inlet ports and the vacuum outlet port.

Thus, there is provided a vacuum manifold adapted to direct air flow from a plurality of manifold input ports to a single manifold output port.

FIG. 3 also shows an upper plate 74, which may be any rigid component of the chassis 20 that is attached substantially parallel to the lower plate 56 and is capable of supporting the disks 14, as described further below.

Figure 4:
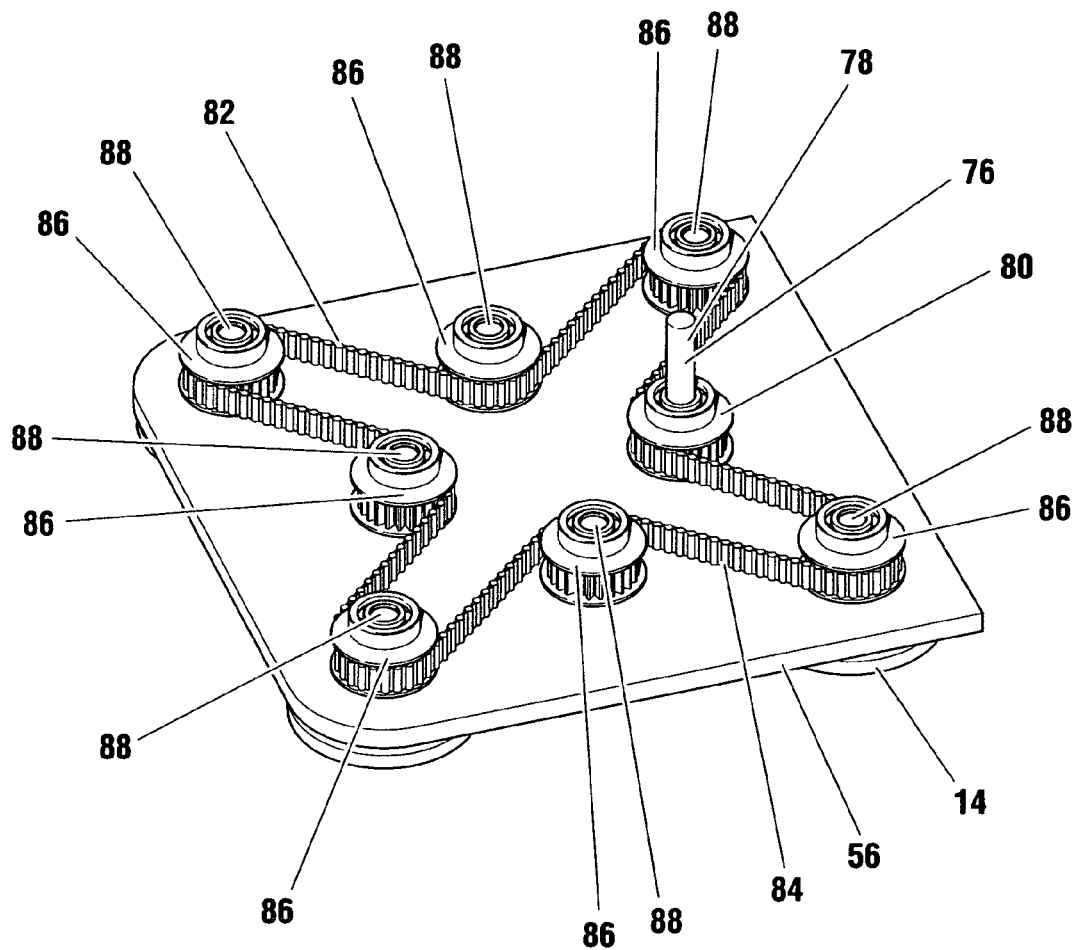
FIG. 4 is a perspective view of a portion of the apparatus shown in FIG. 1, showing a drive belt in continuous contact with pulleys.

FIG. 4 shows a perspective view of a portion of the apparatus 10 in accordance with the preferred embodiment of the invention. The apparatus 10 preferably includes a primary drive shaft 76 having an upper extended end 78, a primary drive pulley 80, a belt 82 having cogs 84, secondary driven pulleys 86, and secondary driven shafts 88 arranged as shown in FIG. 4.

The primary drive shaft 76 is driven at its upper extended end 78 by a motor (not shown) at a desired rotational speed. The upper extended end 78 may be driven via a transmission (not shown) connected between the upper extended end 78 and the motor. The transmission may include a transmission belt, gear mechanism, transmission chain, any combination thereof, and other transmission components. The transmission may be operable to provide fixed or variable speed reduction, or overdrive. The primary drive shaft 76 may include at its upper extended end 78 a plurality of cogs, teeth or other projections (not shown) for engagingly receiving mechanical power from the motor directly or via the transmission.

When the extended end 78 is driven, the primary drive shaft 76 rotates and causes the primary drive pulley 80, which is mounted on the primary drive shaft 76 above and substantially parallel to the lower plate 56, to be rotatably driven. One disk 14 (not visible in FIG. 4) is mounted on the primary drive shaft 76 below and substantially parallel to the lower plate 56 such that the one disk 14 is rotated at the same rotational speed as the primary drive shaft 76. The primary drive shaft 76 is rotatably mounted on the lower plate 56 at a position away from the center of the lower plate 56 so as to be eccentrically mounted on the lower plate 56. Eccentrically positioning the primary drive shaft 76 may advantageously provide an optimal position of the motor above the lower plate 56 to improve the maneuverability of the apparatus 10. Furthermore, an optimal position of the motor results in further compactness or reduced height of the profile of the apparatus 10.

The belt 82 preferably includes teeth or other engagement projections, such as the cogs 84 shown in FIG. 4, on both opposing sides of the belt 82 for engagement with mating projections on the primary drive pulley 80 and the secondary driven pulleys 86. The cogs 84 and mating projections are not necessary where excessive belt slippage can be avoided by frictional contact between the belt 82 and the pulleys 80 and 86. The belt 82 is preferably in continuous contact and connection with the pulleys 80 and 86 such that the primary drive pulley 80 is rotatably connected to the secondary driven pulleys 86. The belt 82 is, in the preferred embodiment, tensioned by means of an adjustable elliptical cam or other means as is known in the art, to maintain belt 82 tension. Rotatably driving the primary drive pulley 80 causes the belt 82 to travel through a serpentine path first contacting the primary drive pulley 80, and then each additional pulley 86 on opposing sides of the belt 82. In this manner, the pulleys 80 and 86 are rotated in alternating directions, thereby minimizing vibration and undesirable lateral movement of the apparatus 10.

The secondary driven pulleys 86 are mounted on secondary driven shafts 88 above and substantially parallel to the lower plate 56 such that the pulleys 80 and 86 are substantially coplanar, thereby preventing binding of the belt 82 and resulting in further compactness of the profile of the apparatus 10. When the belt 82 moves through its serpentine path, the secondary driven pulleys 86 and corresponding secondary driven shafts 88 are rotatably driven. One disk 14 is mounted on each secondary driven shaft 88 below and substantially parallel to the lower plate 56 such that each such mounted disk 14 is rotated at the same rotational speed as its corresponding secondary driven shaft 88.

Figure 5:
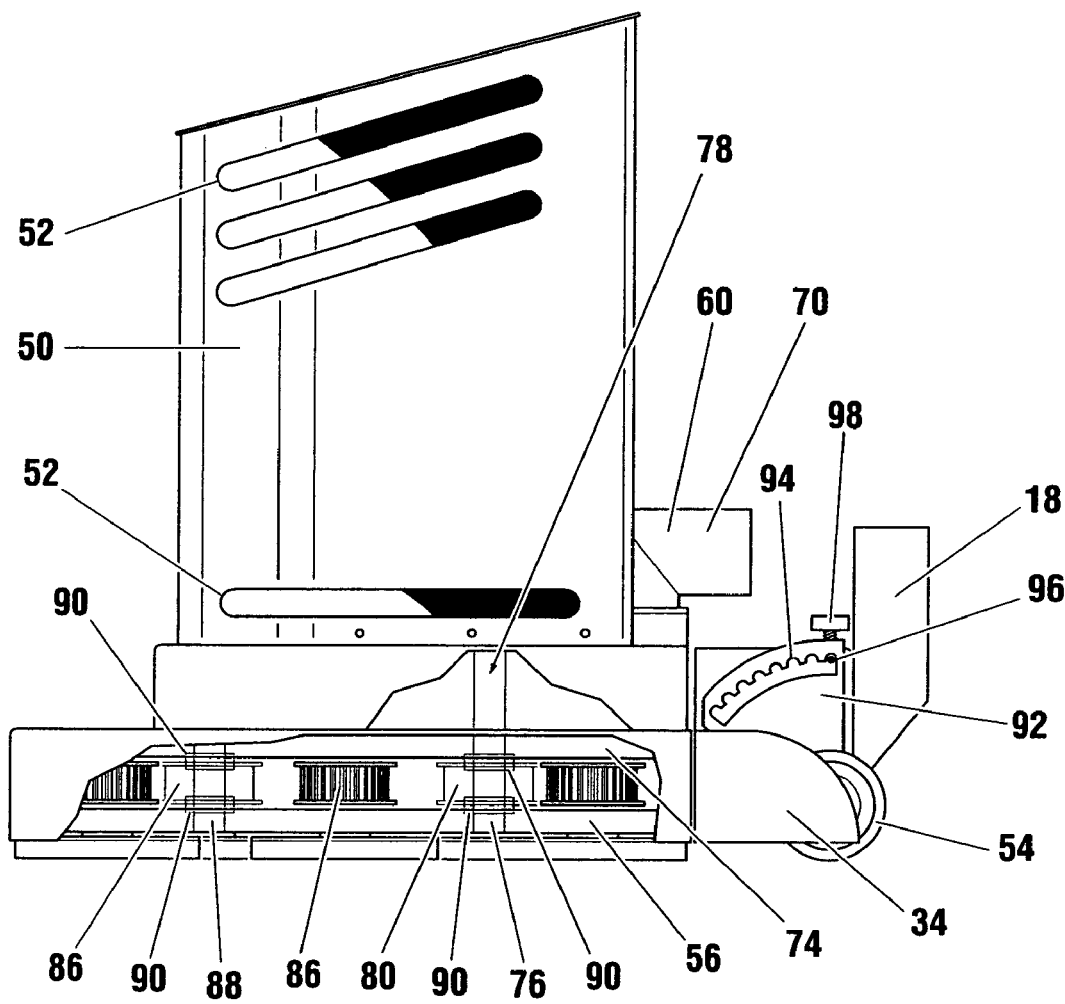
FIG. 5 is a side cut-out view of portions of the apparatus shown in FIG. 1, showing coplanar pulleys disposed between lower and upper plates and showing a handle adjustment mechanism.

Referring to FIG. 5, the pulleys 80 and 86 are disposed between the lower plate 56 and the upper plate 74. The primary drive shaft 76 and the secondary driven shafts 88, to which the pulleys 80 and 86 are respectively mounted, are substantially aligned with the upright or vertical axis of the apparatus 10. The primary drive shaft 76 passes through and extends above the upper plate 74 to the upper extended end 78.

The primary drive shaft 76 and secondary driven shafts 88 are rotatably mounted at opposing ends thereof to the lower and upper plates 56 and 74 by bearings 90, respectively. Each bearing 90 is preferably at least partly embedded into its corresponding plate 56 or 74 so as to minimize the distance between the plates 56 and 74, thereby resulting in further compactness of the profile of the apparatus 10. Furthermore, stabilizing the shafts 76 and 88 at opposing ends thereof provides greater structural stability, thereby reducing vibration and permitting reduced thicknesses of the plates 56 and 74, which results in further compactness of the profile of the apparatus 10.

While a drive mechanism has been described in accordance with the preferred embodiment of the invention, the scope of the invention contemplates other arrangements in which a single drive component is in continuous contact with pulleys 80 and 86. For example, the pulleys 80 and 86 may be in continuous contact via a chain, including a chain arranged to travel in a serpentine path, or a gear or sprocket circumferentially engaging the pulleys 80 and 86.

Thus there is provided in an apparatus having a compact profile a drive mechanism comprising a substantially vertical drive shaft rotatably mounted on a first plate and including a drive pulley mounted on the shaft, the drive pulley being rotatably connected to at least one coplanar pulley mounted on a substantially vertical shaft and disposed between the first plate and a second plate attached substantially parallel to the first plate, thereby facilitating use of the apparatus in height-restricted spaces.

Still referring to FIG. 5, a handle angle adjustment mechanism includes the handle support 18, a bracket 92 having a slotted channel 94, a locking pin 96 and a spring-mounted actuator 98. The handle support 18 is hingedly attached at its lower end to the rear chassis section 34 to permit the handle 16 to be disposed upright or at an angle relative to its upright position. The bracket 92 is attached to the handle support 18 and swings with the handle support 18 as the angle of the handle 16 is adjusted. The slotted channel 94 is dimensioned to permit the locking pin 96 to fit within any one of the slots of the slotted channel 94, and to permit the locking pin 96 to travel along the slotted channel 94 when the spring-mounted actuator 98 is depressed. Depressing the spring-mounted actuator 98 moves the locking pin 96 from within a slot to the main channel, thereby releasing the handle 16 from a locked position and permitting the angle of the handle 16 to be adjusted. The spring-mounted actuator 98 is resiliently urged toward to the locking position and maintains the handle 16 in any given locking position. The spring-mounted actuator 98 is advantageously positioned to permit an operator to use his or her foot to depress the spring-mounted actuator 98.

Variations in the shapes of the housing 40 and the chassis 20 are within the scope of the invention. The rear chassis section 34 may have a rounded shape near the wheels 54 as shown in FIG. 5, or may have a squared shape as shown in FIG. 1, for example.

Figure 6:
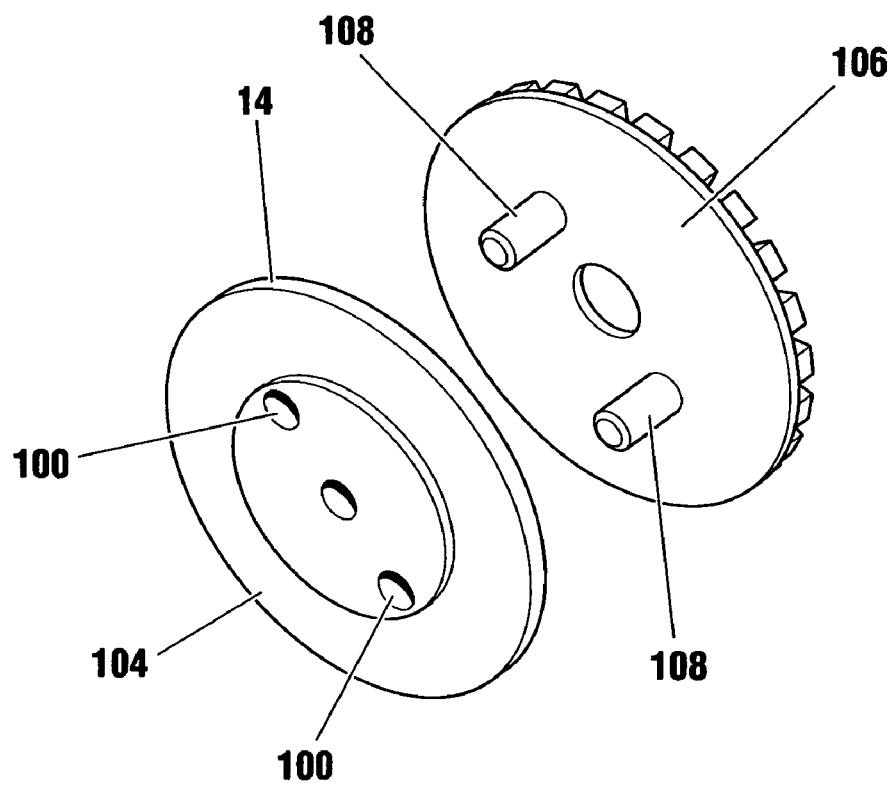
FIG. 6 is a first perspective view of a disk in accordance with the preferred embodiment of the invention in detached alignment with a rigid abrasive pad.
Figure 7:
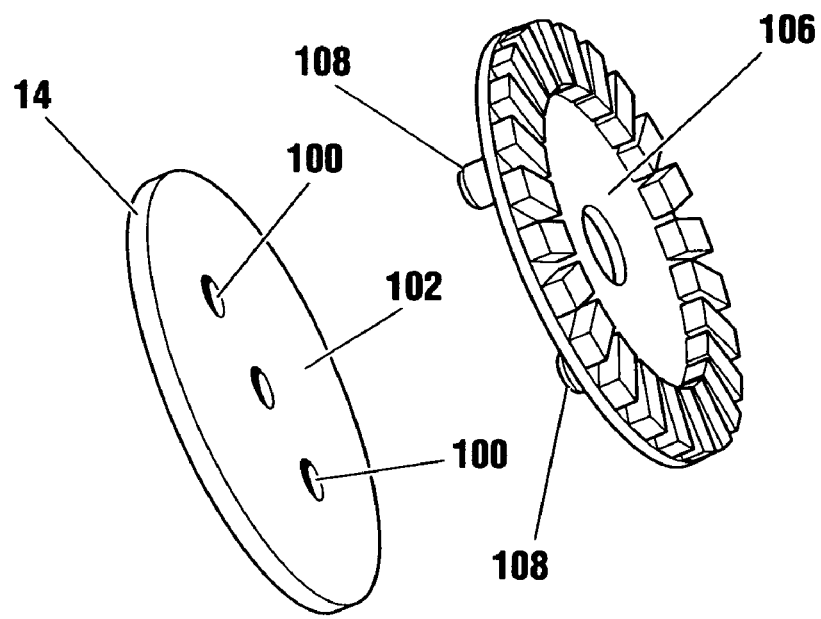
FIG. 7 is a second perspective view of a disk in accordance with the preferred embodiment of the invention in detached alignment with a rigid abrasive pad.

Referring to FIGS. 6 and 7, the disk 14 preferably includes one or more recesses, which may be indentations on one face of the disk 14. Alternatively, the recesses may be a pair of spaced apart pad apertures 100 extending from the lower face 102 through to the upper face 104 of the disk 14 as shown in FIGS. 6 and 7, for example. An abrasive pad, such as the rigid abrasive pad 106 shown in FIGS. 6 and 7, may include mating pins 108 dimensioned for alignment and fitting into or through the pad apertures 100. The rigid abrasive pad 106 may be a diamond abrasive pad, for example. Insertion of the mating pins 108 into the pad apertures 100 advantageously minimizes the likelihood of undesirable separation of the rigid abrasive pad 106 from the disk 14. Additionally or alternatively, hook-and-loop fasteners may be employed for removably fastening rigid or non-rigid abrasive pads. A non-rigid abrasive pad may be sanding paper, for example.

Operation

In operation, a drive, typically an electric motor, variably drives the primary drive shaft 76, which rotates preferably and selectively clockwise or counterclockwise. The primary drive pulley 80 is thereby rotated in the same direction, in turn advancing the belt 82 around the abutting secondary driven pulleys 86, which rotate accordingly, in turn rotating the disks 14 to which abrasive pads are typically attached. The apparatus 10 is maneuvered by the operator effectively over the surface to be abrade, unhindered by low fixtures, and, due to the multiple abrasive pads attached to the disks 14 and low vibration pulley and belt configuration, abrades the surface smoothly without causing burrs, cuff marks or other undesirable effects to the surface 12.

While specific embodiments of the invention have been described and illustrated, such embodiments should be considered illustrative of the invention only. The invention may include variants not described or illustrated herein in detail. For example, one or more weights may be applied to the apparatus to increase abrasive friction applied to the surface. Thus, the embodiments described and illustrated herein should not be considered to limit the invention as construed in accordance with the accompanying claims.

What is claimed is:

1. An apparatus for abrading a surface, the apparatus having a motor and further comprising:
   (a) a primary pulley connected to and adapted to be driven by the motor;
   (b) a single drive component in contact with said primary pulley; and
   (c) a plurality of secondary pulleys, each pulley of said primary and secondary pulleys being adapted to rotate a corresponding disk, said corresponding disk being adapted to receive an abrasive pad,
   wherein said each pulley and said corresponding disk are mounted on a corresponding substantially vertical shaft rotatably mounted at opposing ends thereof on a first plate and a second plate attached substantially parallel to said first plate, respectively, such that said each pulley is disposed between said first and second plates;
   wherein said drive component is in continuous serpentine contact with each said pulley of said primary and secondary pulleys such that each said corresponding disk rotates when said primary pulley is driven; and
   wherein a primary shaft corresponding to said primary pulley extends above said second plate to form an extended end, said primary pulley being mounted on said primary shaft such that said primary pulley is driven when said extended end is driven.

2. The apparatus of claim 1, wherein said drive component comprises a belt, said belt comprising a plurality of cogs on opposing sides of said belt for serpentine engagement with said primary and secondary pulleys.

3. The apparatus of claim 1, further comprising a vacuum manifold comprising a plurality of manifold input ports and a single manifold output port, wherein said vacuum manifold is adapted to direct air flow from said plurality of manifold input ports to said single manifold output port.

4. The apparatus of claim 3, wherein said plurality of manifold input ports comprise a pair of spaced apart apertures extending through a rear section of a plate disposed between said primary and secondary pulleys and said each corresponding disk.

5. The apparatus of claim 1, further comprising front corners, wherein said front corners of the apparatus are rounded so as to facilitate abrading along an edge of the surface.

6. The apparatus of claim 1, further comprising a handle secured to the apparatus, said handle being curved and containing therein a power switch for controlling power to the apparatus.

7. The apparatus of claim 6, wherein said handle is secured at an adjustable angle to an articulated chassis of the apparatus.

8. The apparatus of claim 1, wherein said each corresponding disk comprises one or more recesses for receiving respective mating pins of a rigid abrasive pad.

* * * * *